United States Patent [19]

Bostelmann

[11] Patent Number: 5,692,983
[45] Date of Patent: Dec. 2, 1997

[54] VARIABLE RATIO DRIVE PULLEY

[75] Inventor: Willy Bostelmann, Wels, Austria

[73] Assignee: Bombardier, Inc., Montreal, Canada

[21] Appl. No.: 740,607

[22] Filed: Oct. 31, 1996

[51] Int. Cl.$^6$ ............................................. F16H 55/52
[52] U.S. Cl. ............................................. 474/14; 474/94
[58] Field of Search ............................ 474/14, 8, 43, 474/94

[56] References Cited

U.S. PATENT DOCUMENTS

| | | | |
|---|---|---|---|
| 3,174,348 | 3/1965 | Luenberger | 474/43 |
| 3,230,787 | 1/1966 | Siegal | 474/14 |
| 3,597,987 | 8/1971 | Kiekhaefer | 474/14 |
| 3,727,478 | 4/1973 | Erickson et al. | 474/14 |
| 3,733,918 | 5/1973 | Domaas | 474/14 |
| 3,759,111 | 9/1973 | Hoff | 474/14 |
| 3,777,583 | 12/1973 | Talbot | 474/14 |
| 3,939,720 | 2/1976 | Aaen et al. | 474/14 |
| 3,971,263 | 7/1976 | Beaudoin et al. | 474/14 |
| 3,986,406 | 10/1976 | Prasad | 474/14 |
| 4,027,544 | 6/1977 | Kobayashi | 474/14 |
| 4,052,908 | 10/1977 | Takagi et al. | 474/14 |
| 4,095,479 | 6/1978 | Lundberg | 474/12 |
| 4,242,921 | 1/1981 | Bremer, Jr. | 74/574 |
| 4,313,728 | 2/1982 | Prasad | 474/14 |
| 4,432,743 | 2/1984 | Pitoiset | 474/14 |
| 4,464,144 | 8/1984 | Kobayashi | 474/14 |
| 4,486,183 | 12/1984 | Posiviata et al. | 474/94 |
| 4,710,152 | 12/1987 | Ichikawa et al. | 474/166 |
| 4,772,248 | 9/1988 | De Briel | 474/14 |
| 4,781,659 | 11/1988 | Gebhardt | 474/94 |
| 5,326,330 | 7/1994 | Bostelmann | 474/13 |

FOREIGN PATENT DOCUMENTS

| | | |
|---|---|---|
| 320769 | 3/1932 | Canada. |
| 985931 | 3/1976 | Canada. |
| 1112079 | 10/1981 | Canada. |
| 1305498 | 7/1992 | Canada. |

*Primary Examiner*—Thomas R. Hannon
*Attorney, Agent, or Firm*—Larson & Taylor

[57] ABSTRACT

A variable ratio drive pulley of the type employed in snowmobiles to transmit a drive from the snowmobile engine to a variable ratio belt drive transmission has a fixed flange and an opposed movable flange which cooperate to drive the belt. The drive pulley is coupled to rotate with the engine crankshaft and the movable flange incorporates centrifugal weights that operate to advance it towards the fixed flange, with a force that increases with speed of rotation to grip the transmission belt between the flanges and apply a driving torque thereto, this torque being applied by both the flanges. To reduce the effects of engine induced vibrations on the centrifugal weights and on the movable flange, a damping structure is incorporated in the torque path between the engine crankshaft and the centrifugal weights and movable flange. The damping structure comprises a hexagonal rubber ring that is positioned between a driving head and the hub of the drive pulley to absorb vibrations which would otherwise be transmitted between these.

14 Claims, 4 Drawing Sheets

1

VARIABLE RATIO DRIVE PULLEY

BACKGROUND OF THE INVENTION (a) Field of the Invention

This invention relates to a new or improved variable ratio drive pulley or clutch for the transmission of a driving torque to a flexible belt in a belt drive arrangement, the new pulley being particularly although not exclusively useful in a snowmobile drive transmission.

(b) Description of the Prior Art

In my U.S. Pat. No. 5,326,330, the disclosure of which is hereby incorporated by reference, I describe a drive pulley as utilized in a snowmobile transmission. The drive pulley includes a central axial shaft carrying two frustoconical flanges one of which is fixed to rotate with the shaft and the other of which is guided to move axially towards and away from the fixed flange. The movable flange is urged away from the fixed flange by a spring, and the pulley includes an arrangement of pivoted weighted levers designed on rotation of the pulley to generate an axial force on the movable flange to displace it towards the fixed flange, this force increasing with rotational speed of the pulley.

A drive pulley of the type discussed above, otherwise described as a clutch, is generally coupled directly to the crankshaft of the engine and thus is subjected to engine induced vibrations at both pulley flanges. In particular, the drive pulley of a snowmobile transmission is commonly mounted directly to the crankshaft of a high specific horsepower two-stroke engine and may be subjected to a very high level of vibration, both bending and torsional, emanating from the engine crankshaft. This can be deleterious both to the force generating means and to the drive belt itself. Indeed it is common for drive pulleys of this kind used in snowmobiles to experience wear in the load mechanism or force generating means. This wear is caused mainly by torsional vibration, and to maintain optimum performance of the system it may be necessary to replace various components of the mechanism periodically. The constantly increasing power outputs of snowmobile engines applies additional loading stresses to the components so that there is a need to improve the resistance of drive pulleys to engine induced vibrations.

SUMMARY OF THE INVENTION

The invention accordingly provides a variable ratio drive pulley comprising: a) a shaft; b) confronting fixed and movable frusto-conical flanges mounted on said shaft to rotate therewith, said fixed flange being fixed to said shaft and said movable flange being guided to move axially of said shaft towards and away from said fixed flange; c) a spring in said pulley being operative to urge said movable flange away from said fixed flange; d) a centrifugally responsive mechanism in said pulley being operative on rotation of said pulley to generate a force Urging said movable flange towards said fixed flange, such force increasing with the rotational speed of said pulley; e) a torque transmitter for transmitting a driving torque from said shaft to said movable flange, said torque transmitter comprising an operating head assembly fixed to rotate with said shaft, said head assembly including a plurality of radial driving arms equiangularly spaced about the axis of said shaft, said driving arms engaging abutment surfaces on said movable flange at a radial spacing from said shaft axis to deliver driving torque to said movable flange; f) said head assembly and said movable flange having cooperating axially extending guide surfaces by which said movable flange is guided from movement axially of said shaft; g) said head assembly being connected to said shaft through a damping element said damping element being operative to attenuate transmission of torsional vibrations from said shaft to said movable flange.

The movable flange is preferably guided for axial movement on an axially extending hollow input shaft or sleeve, the fixed flange being attached to the sleeve, and the sleeve carrying a hub through which torque is transmitted to the centrifugally responsive means by way of the damping element. In this way, the effects of engine-induced vibrations are absorbed and dampened, and this protects the centrifugally responsive means from the damaging effects of such vibrations. Furthermore the effects of vibrations transmitted to the drive belt from the movable flange are substantially eliminated.

The element can be positioned at any convenient location in the operating head assembly, and in one preferred arrangement is located in the hub region thereof.

An added benefit of the incorporation of the damping element is that it effects a significant reduction in the level of noise generated by the variable ratio drive pulley in operation. Thus the invention also provides a method for reducing the noise output of variable ratio pulleys of this general type.

BRIEF DESCRIPTION OF THE DRAWINGS

The invention will further be described, by way of example only, with reference to the accompanying drawings wherein.

DESCRIPTION OF THE PREFERRED EMBODIMENT

Figure 2:
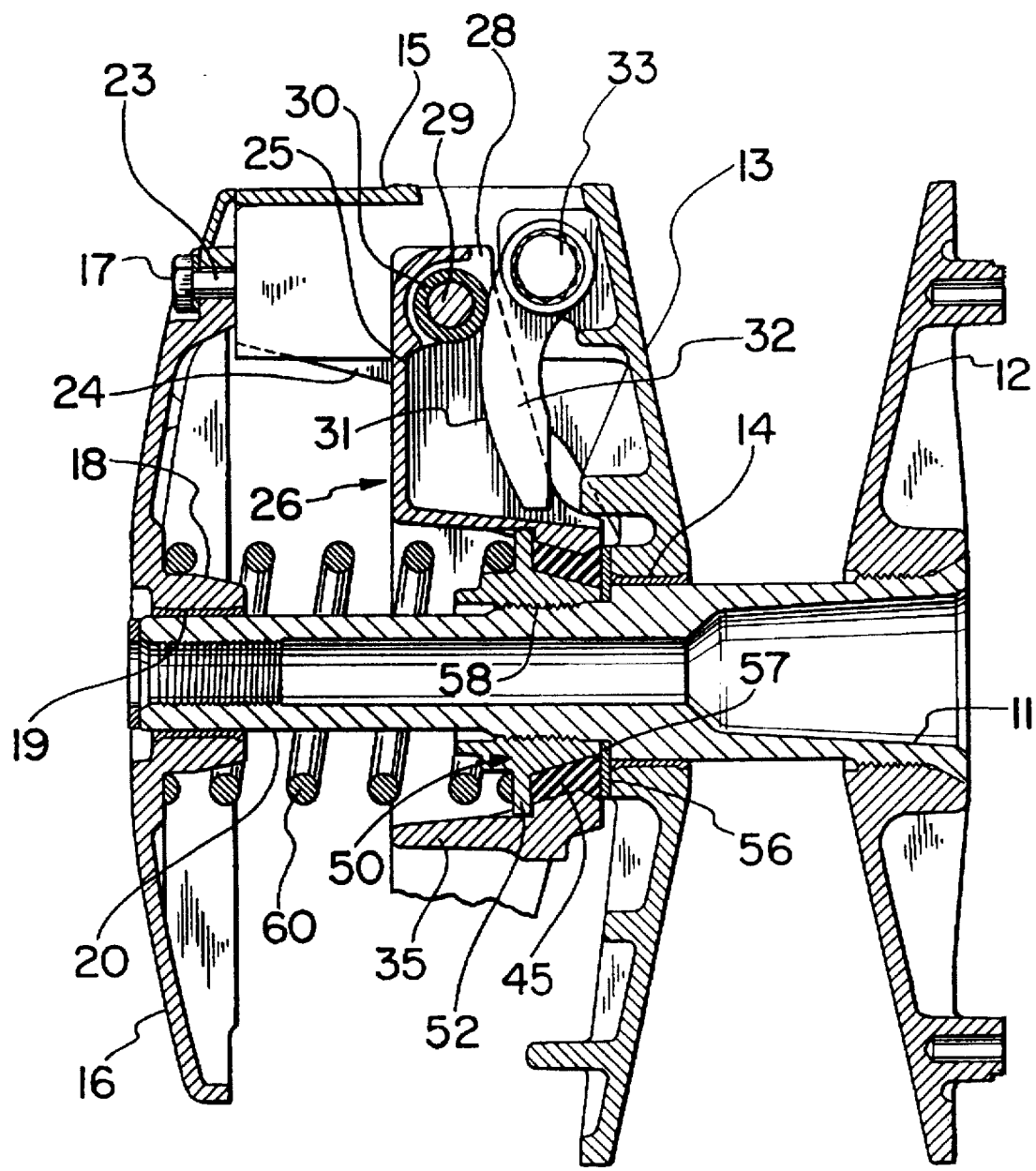
FIG. 2 is a sectional view taken generally on the line II—II in FIG. 1.

Referring to FIG. 2, the drive pulley comprises a hollow tubular shaft 11 which carries opposed frusto-conical flanges 12 and 13. The flange 12 is a fixed flange that is rigidly secured to the shaft 11, whereas the flange 13 is a movable flange guided for movement axially of the shaft 11 towards and away from the fixed flange by a bushing 14. The rear side of the movable flange 13 carries in a hollow housing 15 closed on its rear side by a convex cover 16 that is detachably secured to the housing by capscrews 17, the cover having a central axially projecting hub 18 that carries a tubular bushing 19 which slidably engages a reduced diameter portion 20 of the shaft 11.

The capscrews 17 are six in number and are received in threaded engagement in bores of axially extending bosses 23 (FIG. 2) arranged in pairs, each boss being associated with an axially extending guide wall 24 which walls are integral with the rear side of the movable flange 13. The guide walls cooperate with the limbs 25 of a three-armed operating head 26 which is mounted to rotate with the shaft 11. The operating head 26 transmits driving torque from the shaft 11 to the movable flange while permitting the latter to move axially with respect to the shaft 11. More specifically, near its extremity each of the limbs 25 carries a pair of pads 27 of low-friction material each seated in a counterbore in one side of the limb, each pad 27 being in sliding engagement with one of the guide walls 24, spring means (not shown) being provided to take up any clearance between the limbs 25, pads 27 and guide walls 24.

Each limb 25 also carries a roller 30 rotatably mounted on an axis that is tangential to and in a plane perpendicular to the axis of the shaft 11, and is coaxial with the sliding pads 27. Each roller 30 is positioned between bifurcate fingers 28 being carried on a pin 29 mounted in bores in the fingers 28 and aligned with the pads 27.

Each roller 30 is mounted to cooperate with a cam surface 31 of an adjusting lever 32 which extends generally radially with respect to the axis of the shaft 11 and is pivotally mounted on the rear side of the movable flange 13 on an axis generally parallel to that of the roller 30. As is more fully described in my U.S. Pat. No. 5,326,330, the pivotal mounting of each adjusting lever includes an adjustable eccentric 33 by means of which the location of the pivotal axis of the lever 32 can be adjusted. The operation of this adjustment in varying the performance characteristics of the pulley is as described in my above identified previous patent, and is not further described herein.

Figure 3:
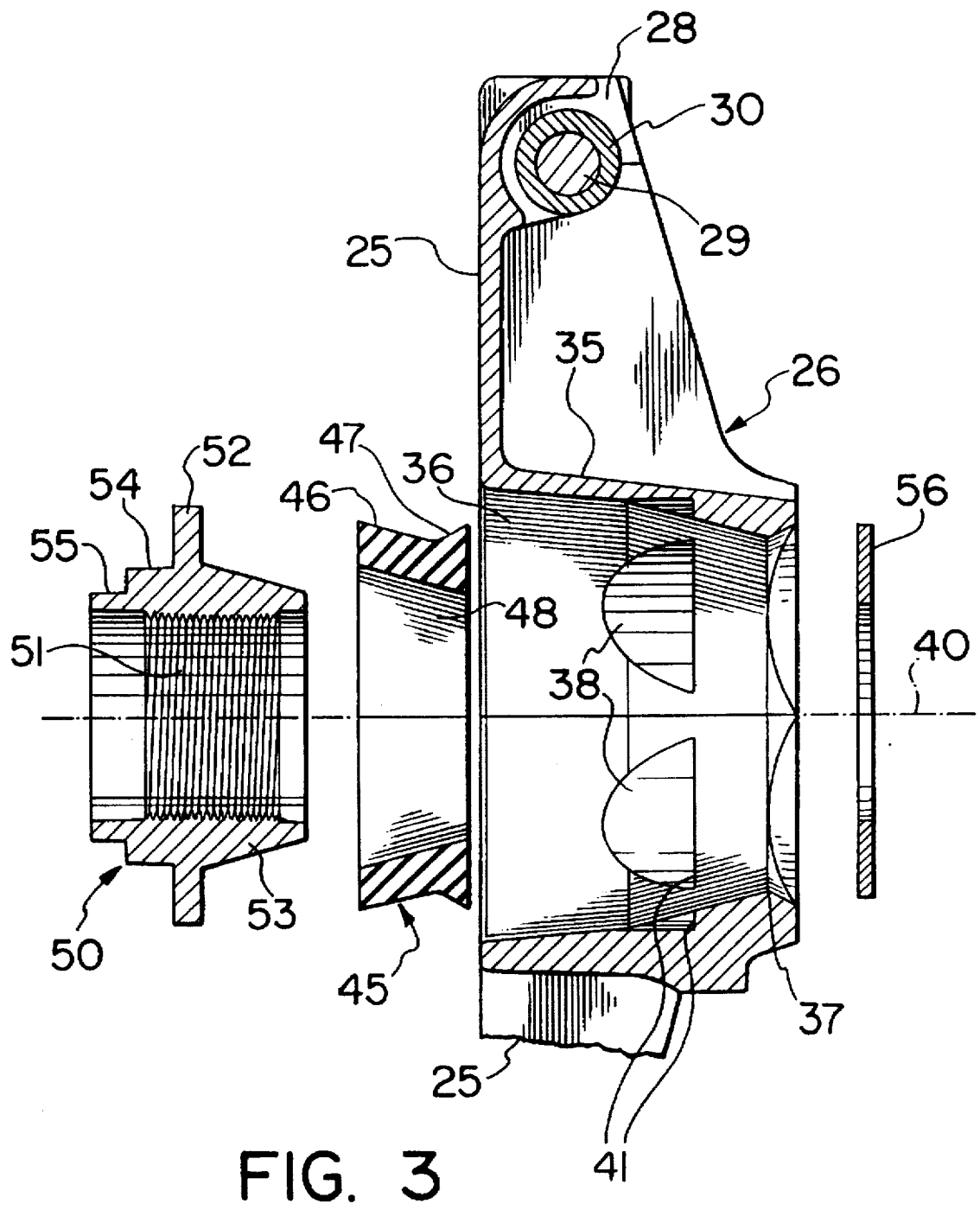
FIG. 3 is an exploded sectional view of certain components shown in FIG. 2.

As previously mentioned, the three-armed operating head 26 is fixed to rotate with the shaft 11. However it is structured so that it includes a vibration absorbing structure thereby to attenuate or eliminate vibrations transmitted from the shaft to the movable pulley flange 13. Referring to FIG. 3, the operating head 26 has a large hollow central hub 35 which has an interior surface 36 of tapered hexagonal profile. The profile reaches a minimum size at a location 37 near the right hand end of the hub as seen in FIG. 3, and then flares outwardly. Each facet of the internal surface 36 has machined therein a part-cylindrical recess 38, the recesses 38 being coaxial with respect to the central axis 40 and each terminating in a shoulder 41, the shoulders lying in a common plane at right angles to the axis 40.

A vibration absorbent resilient damping member 45 is sized to be positioned within the hub 35 near one end (the right hand end as seen in FIG. 3) of the interior surface 36. The damping member 45 is of a suitable resilient material such as polypropylene, natural and synthetic rubbers and the like, and is in the form of an hexagonal ring sized to fit closely against the internal surface 36. Thus, the outside of the member 45 has a first tapered hexagonal surface 46 and a second shorter expanding hexagonal surface 47, the inner surface 48 being continuously tapered from one end to the other, and the end surfaces being in planes perpendicular to the axis 40. The slightly enlarged section 47 of the damping member 45 acts to retain the latter against displacement rearwardly (to the left as seen in FIG. 2) and separation from the operating head 26.

A tubular driver hub 50 secures the operating head 26 with respect to the shaft 11, and is most clearly shown in FIG. 3. The driver hub 50 has a screwthreaded bore 51 with short cylindrical counterbores at opposite ends thereof, and has at a medial position in its length a projecting external annular flange 52. As seen in FIG. 3, to the right of the flange 52 there is a tapered hexagonal surface section 53 which has a profile that corresponds to that of the inner surface 48 of the damping member. Still with reference to FIG. 3, to the left of the flange 52 the driver hub has a short cylindrical section 54, and terminates in a short hexagonal driving section 55. The outer diameter of the flange 52 is of a size to fit within the cylindrically formed recesses 38.

In the assembled condition, the damping member 50 is fitted within the hub 35 and is positioned adjacent a flat annular washer 56 which in turn is supported against an annular shoulder 57 on the shaft 11 (FIG. 2). The driver hub 50 is in engagement with screwthreaded section 58 of the shaft 11, with the flange 52 received in the recesses 38 so that the damping member 45 is contained at its opposite ends between the flange 52 and the washer 56 and is contained at its internal and external peripheries by the tapered hexagonal driver surface 53 and the tapered hexagonal hub surface 36 respectively. During assembly, after the fixed flange 12 has been installed on the shaft, the movable flange 13 is then mounted and the washer 56 placed against the shoulder 57 of the shaft. The damping member 45 is then fitted within the bore of the operating head 26, and these are then passed over the shaft to the position shown in FIG. 2 where the damping member 45 abuts the washer 56. The driver hub 50 is then installed, being threaded onto the screwthreaded section 58 of the shaft to bring the flange 52 into abutment with the end surface of the damping member 45, and compress the latter to the degree desired.

In the fully installed position the washer 56 is engaged and clamped against the shoulder 57 by the forward end of the driver hub 50. Rotation of the driver hub 50 can be effected by a wrench or the like engaging the hexagonal drive section 55 of the hub. In the fully installed position therefore the damping member 45 is contained at its ends between the washer 56 and the hub flange 52, and on its inner and outer sides between the hexagonal hub surface 53 and the hexagonal surface sections 36, 37 of the driver 26 respectively. In this condition there is no metal-to-metal contact between the operating head 26 and the parts (hub 50 and washer 56) attached to the shaft 11. Thus there is substantial clearance between the flange 52 and the recesses 38 and shoulders 41 of the operating head and between the outer periphery of the washer 56 and the hub 35 of the operating head that no metal-to-metal contact can occur, even if the hub 50 and the washer 56 undergo substantial torsional and bending vibration transmitted from the shaft 11.

From the foregoing description and from a consideration of FIG. 2 of the drawings it will be appreciated that the components described effectively fix the operating head 26 with respect to the shaft 11 so that torque from the shaft can be transmitted to the operating head 26 and thence to the weighted pivoted levers 32 and the movable pulley flange 13. However as noted above, there is no continuous metal-to-metal engagement in the path between the shaft 11 and the operating head 26. Instead, torque from the shaft is transmitted through the driver hub 50 to the damping member 45 and from the latter to the operating head 26. Reliable torque transmission is ensured by the hexagonal shape of the damping member 45, there being no need for the latter to be bonded either to the driver hub 50 or to the operating head 26.

A coiled compression spring 60 is positioned with one end seated against the cover 16 around the hub 18, and its opposite end seated against the flange 52 around the cylindrical section 54 of the driver hub 50. As indicated previously, the cover 16 is fixedly secured to the movable flange 13 by capscrews 17, this configuration allows the spring 60 to apply a compressive load to and press the inner section of the movable flange 13 against the washer 56 (adopting the position shown in FIG. 2). When the parts are positioned as shown in FIG. 2 with the movable flange 13 at its maximum spacing from the fixed flange 12, the compressive loading applied to the spring 60 is minimal. A low-friction plastic carrier may be interposed between the hub 18 and the adjacent end of the spring 60 to avoid fretting or abrasive wear of hub 18 due to vibration of the spring.

In general, the operating characteristics of the drive pulley are similar to those of the drive pulley described in my U.S. Pat. No. 5,326,330. When the shaft 11 is stationary or rotating at low speed, the components occupy the positions shown in FIG. 2 with the movable flange 13 at maximum spacing from the fixed flange 12 so that the flanges do not apply any driving torque to the V-shaped driving belt (not shown) which is located therebetween. With increasing speeds of rotation, the centrifugal force acting on the adjustable levers 32 tends to pivot these outwardly around their pivotal mountings so that the cam surfaces 31 interact with the rollers 32 to develop an axial thrust urging the movable flange towards the fixed flange. When this axial thrust reaches a sufficient level, it overcomes the loading of the spring 60 and the flange 13 is displaced towards the fixed flange 12 to engage the drive belt therebetween, as is well understood.

The damping arrangement described acts to isolate the movable flange and all the components associated therewith including the bushing 14, the centrifugal levers 32 and their eccentrics 33, the cover 16, guide walls 24 and the operating head 26 from the effects of torsional vibrations generated on the engine crankshaft (not shown) to which the shaft 11 is connected. These vibrations are particularly troublesome in high output two-stroke engines of the type commonly used in recreational vehicles such as snowmobiles. The damping assembly improves the performance and reliability of such products while enabling them to operate more quietly.

Furthermore, testing has shown that the service life of a snowmobile drive pulley of the type disclosed in my U.S. Pat. No. 5,326,320 can be greatly improved by the addition of a damping arrangement as described above. In some tests it was found that the service life of the drive pulley was increased by a factor of up to 10 before maintenance was required.

The use of a damping arrangement as described offers a further major benefit in that it provides a method of achieving a significant reduction in noise generated during operation of the drive pulley. Various elements of the mechanism involve metal-to-metal or metal-to-plastic contact and there will usually be sufficient clearance between the components that when the pulley is subjected to vibrations, rattling and hammering noises can be generated. Such noises are greatly reduced by incorporating a damping arrangement as described since the latter is effective to more or less completely attenuate vibrations which otherwise would be transmitted through the movable components.

Figure 1:
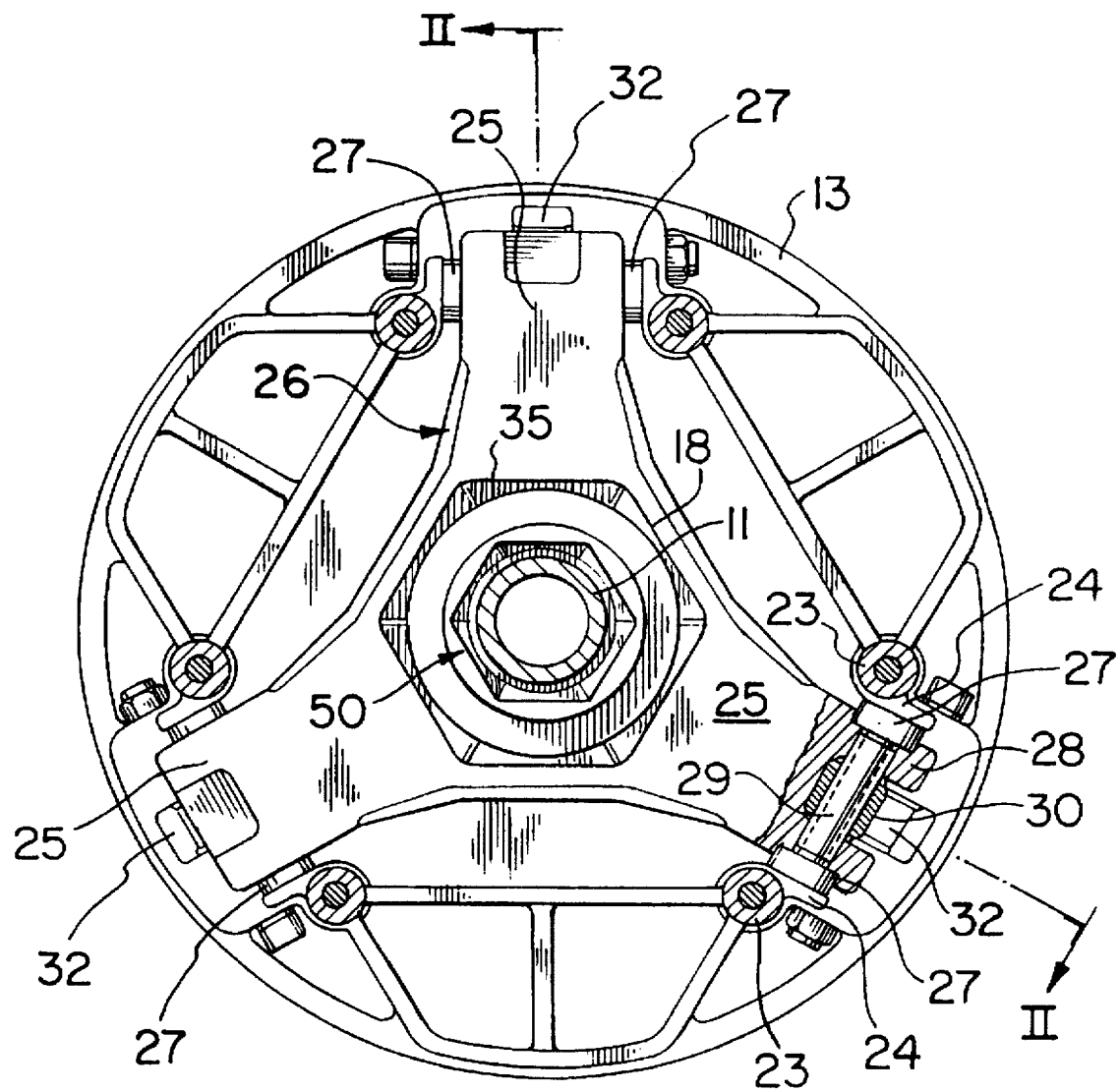
FIG. 1 is a partially fragmentary cross-sectional view of a preferred embodiment of variable ratio drive pulley in accordance with the invention.
Figure 4:
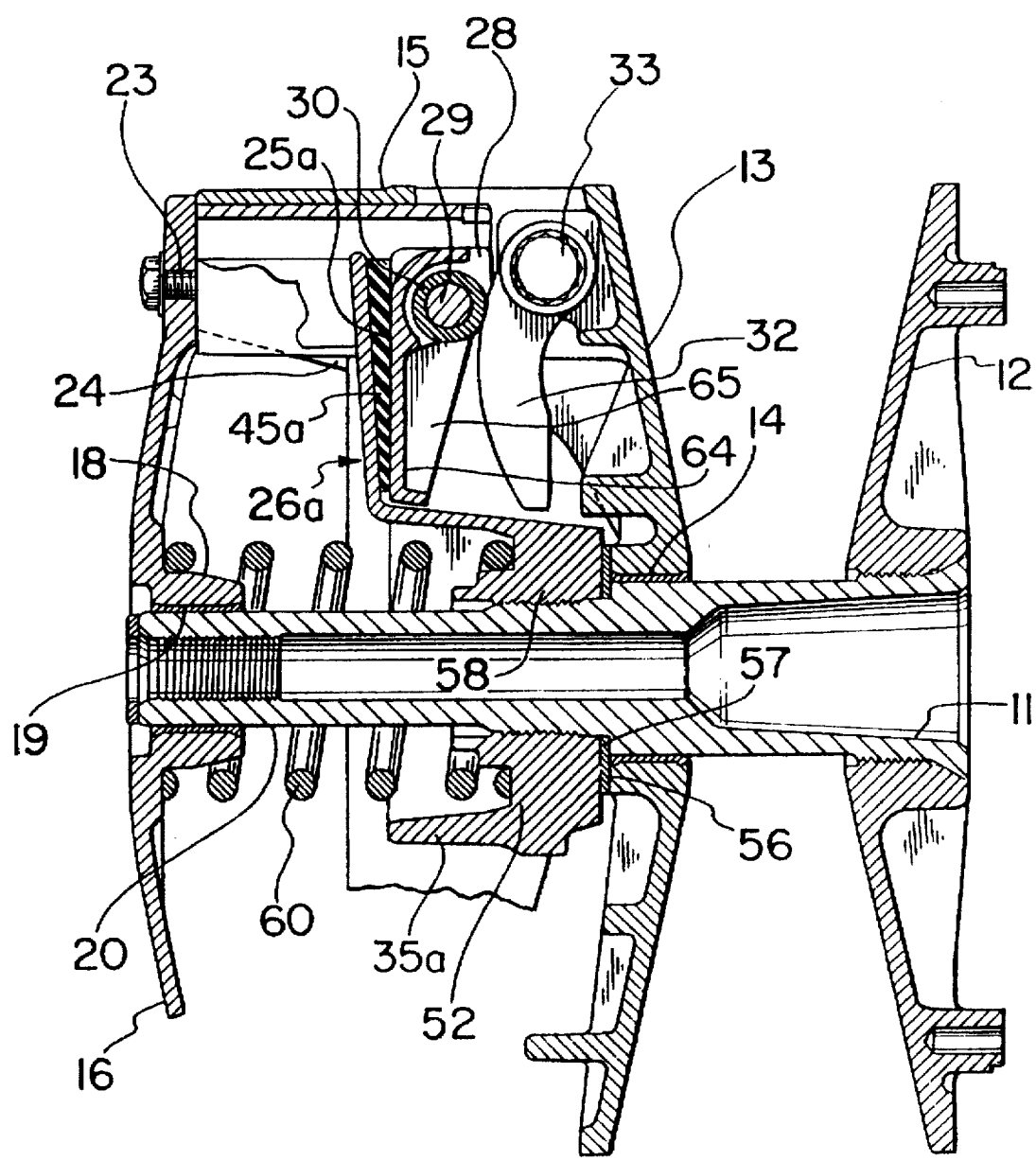
FIG. 4 is a view corresponding to FIG. 2 but showing a modified embodiment of variable ratio drive pulley in accordance with the invention.

Referring now to FIG. 4 the overall configuration of the variable ratio drive pulley illustrated therein is similar to that as shown in FIGS. 1 to 3 and like reference numbers are used to identify like elements thereof. In contrast to the first described embodiment, in FIG. 4 there is no damping member 45 located in the region of the hub, but rather the three-armed operating head 26a has an integral hub 35a and includes modified arms 25a carrying the damping elements. More specifically, in each arm there is a damping element 45a in the form of a flat rectangular piece of resilient damping material bonded to a surface of the arm 25a, these damping elements 45a lying in a common plane that is at right angles to the axis of the shaft 11. On its opposite side, each damping element 45a is bonded to a co-extensive flat wall 64 of a carrier 65, this carrier having integrally formed thereon the fingers 28 that support the pin 29 and roller 30.

As before, the material of the damping elements can be of any suitable natural or synthetic rubber, for example NBR (Nitrile-butadiene) of a hardness of 65±5 Shore A.

It will be seen that as with the first described embodiment, in the embodiment of FIG. 4 the centrifugally mechanism involving the inter-engaging rollers 30 and levers 32 as well as the movable flange 13 itself are effectively isolated from vibrations. This embodiment also is effective to significantly reduce the generation of noise.

Although the invention has been exemplified in the foregoing by the description of presently preferred embodiments of variable ratio drive pulley, and methods of reducing the vibration and noise output thereof, it will be understood that many modifications can be made in the details of the invention. Thus, the internal and external surfaces of the damping member 45 in FIGS. 1 to 3 are described as being hexagonal, while it will be evident that many other polygonal and non-circular shapes would be feasible. Indeed by bonding the damping member 45 (FIG. 2) to the driver hub 50 and/or to the operating head hub 35, it would be possible to utilize cylindrical or conical shapes for such bonded surfaces. Similarly the damping member although illustrated in FIGS. 1 to 3 as being incorporated between the operating head and the driver hub, could in fact be incorporated within the operating head itself e.g. as shown in FIG. 4, the determining requirement being that the movable flange 13, the weighted levers 32 and the rollers 30 be isolated from engine-induced shaft vibrations.

What I claim my invention is:

1. A variable ratio drive pulley comprising:
   a) a shaft;
   b) confronting fixed and movable frusto-conical flanges mounted on said shaft to rotate therewith, said fixed flange being fixed to said shaft and said movable flange being guided to move axially of said shaft towards and away from said fixed flange;
   c) a spring in said pulley being operative to urge said movable flange away from said fixed flange;
   d) a centrifugally responsive mechanism in said pulley being operative on rotation of said pulley to generate a force urging said movable flange towards said fixed flange, such force increasing with the rotational speed of said pulley;
   e) a torque transmitter for transmitting a driving torque from said shaft to said movable flange, said torque transmitter comprising an operating head assembly fixed to rotate with said shaft, said head assembly including a plurality of radial driving arms equiangularly spaced about the axis of said shaft, said driving arms engaging abutment surfaces on said movable flange at a radial spacing from said shaft axis to deliver driving torque to said movable flange;
   f) said head assembly and said movable flange having cooperating axially extending guide surfaces by which said movable flange is guided from movement axially of said shaft;
   g) said head assembly being connected to said shaft through a damping element said damping element being operative to attenuate transmission of torsional vibrations from said shaft to said movable flange.

2. A variable ratio drive pulley as claimed in claim 1 wherein said shaft carries an annular hub that encloses and is attached to a portion of said shaft, said head assembly including an outer part which incorporates said driving arms and which has an inner periphery that is in register with an outer peripheral portion of said hub, said damping element comprising a ring of resilient damping material that is interposed between said hub and said inner periphery, and that is mounted to accommodate vibrational movements between said hub and said outer part.

3. A variable ratio drive pulley as claimed in claim 2 wherein said ring of resilient damping material has an outer profile and an inner profile which are both of non-circular outline to engage elements of complementary outline associated with said hub and said head assembly respectively whereby to transmit torque between said shaft and said head assembly while absorbing vibrations.

4. A variable ratio drive pulley as claimed in claim 3 wherein said ring of resilient damping material is of polygonal outline in a plane normal to said shaft axis.

5. A variable ratio drive pulley as claimed in claim 3 wherein said ring of resilient damping material is compressed axially between an abutment face associated with said shaft and a radial flange on said hub.

6. A variable ratio drive pulley as claimed in claim 5 wherein said abutment face is provided on an annular ring that is supported on a shoulder on said shaft, said ring having an opposite side which provides an abutment for engagement by said movable flange in limiting the maximum spacing of said movable flange from said fixed flange.

7. A variable ratio drive pulley as claimed in claim 3 wherein said hub is mounted in engagement with said shaft portion, and is rotatable by means of a tool to adjustably compress said ring of resilient damping material.

8. A variable ratio drive pulley as claimed in claim 7 wherein said spring comprises a coiled compression spring one end of which seats on said hub and an opposite end of which seats on a cup which is attached to move with said movable flange and which supports the axially extending guide surfaces thereof.

9. A variable ratio drive pulley as claimed in claim 2 wherein said damping element is bonded to at least one of said hub and said inner periphery of said head assembly.

10. A variable ratio drive pulley comprising:

a) a shaft;

b) confronting fixed and movable frusto-conical flange mounted on said shaft to rotate therewith, said fixed flange being fixed to said shaft and said movable flange being guided to move axially of said shaft towards and away from said fixed flange;

c) a spring in said pulley being operative to urge said movable flange away from said fixed flange;

d) a torque transmitter for transmitting a driving torque from said shaft to said movable flange, said torque transmitter comprising an operating head assembly fixed to rotate with said shaft, said head assembly including a plurality of radial driving arms equiangularly spaced about the axis of said shaft, said driving arms engaging abutment surfaces on said movable flange at a radial spacing from said shaft axis to deliver driving torque to said movable flange;

e) said head assembly and said movable flange having cooperating axially extending guide surfaces by which said movable flange is guided from movement axially of said shaft;

f) a centrifugally responsive mechanism acting between said movable flange and said operating head assembly in said pulley and being operative on rotation of said pulley to generate a force urging said movable flange against the urging of said spring towards said fixed flange, such force increasing with the rotational speed of said pulley;

g) said head assembly being connected to said centrifugally responsive mechanism through a damping element said damping element being operative to attenuate transmission of torsional vibrations from said shaft to said movable flange.

11. A variable ratio drive pulley as claimed in claim 10 wherein said damping element comprises a respective piece of damping material operatively connected between each said radial driving arm and said centrifugally responsive mechanism.

12. A variable ratio drive pulley as claimed in claim 11 wherein each said piece is bonded to a surface of the respective radial driving arm and a confronting surface associated with said centrifugally responsive means.

13. A variable ratio drive pulley as claimed in claim 12 wherein said centrifugally responsive mechanism comprises a respective pivoted weighted lever in register with each of said radial driving arms each said lever cooperating with a respective roller, said confronting surface being on an element which supports one of said lever and said roller.

14. A variable ratio drive pulley as claimed in claim 13 wherein each said pivoted weighted lever is pivotally mounted on said movable flange through an adjustable mounting.

* * * * *